United States Patent
Dakroub et al.

(10) Patent No.: US 9,123,355 B1
(45) Date of Patent: Sep. 1, 2015

(54) HAMR CHANNEL TO PREAMP INTERFACE

(71) Applicant: Seagate Technology LLC, Cupertino, CA (US)

(72) Inventors: Housan Dakroub, Dearborn Heights, MI (US); Christine Green, Longmont, CO (US); Edward C. Gage, Lakeville, MN (US); Tim Rausch, Farmington, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 14/028,413

(22) Filed: Sep. 16, 2013

(51) Int. Cl.
*G11B 11/00* (2006.01)
*G11B 5/02* (2006.01)
*G11B 13/04* (2006.01)
*G11B 11/105* (2006.01)
*G11B 5/00* (2006.01)
*G11B 7/126* (2012.01)

(52) U.S. Cl.
CPC ............ *G11B 5/02* (2013.01); *G11B 11/10515* (2013.01); *G11B 11/10595* (2013.01); *G11B 13/04* (2013.01); *G11B 7/126* (2013.01); *G11B 11/1053* (2013.01); *G11B 2005/0021* (2013.01)

(58) Field of Classification Search
CPC ............ G11B 5/02; G11B 2005/0021; G11B 20/10222; G11B 2220/2516; G11B 11/10595; G11B 11/10515; G11B 7/126; G11B 11/1053; G11B 13/04

USPC .......... 369/13.27, 13.26, 13.24, 13.02, 47.28, 369/13.01, 53.12, 53.34, 59.19, 47.19, 369/124.02

See application file for complete search history.

(56) References Cited

U.S. PATENT DOCUMENTS

| | | | |
|---|---|---|---|
| 6,873,576 B1 | 3/2005 | Van Kesteren | |
| 7,136,328 B2 * | 11/2006 | Miyaoka | ................... 369/13.27 |
| 8,289,821 B1 | 10/2012 | Huber | |
| 8,310,902 B1 | 11/2012 | Contreras et al. | |
| 8,315,128 B1 | 11/2012 | Wilson et al. | |
| 2012/0275279 A1 | 11/2012 | Wilson et al. | |
| 2013/0077453 A1 | 3/2013 | Alex | |

* cited by examiner

*Primary Examiner* — Ali Neyzari
(74) *Attorney, Agent, or Firm* — Cesari & Reed LLP; Kirk A. Cesari

(57) ABSTRACT

A circuit may be configured to reduce the power consumption and extend the life of a near field transducer of a heat-assisted magnetic recording (HAMR) device by pulsing a laser. The current that drives the laser may be of a frequency and magnitude so as to approximate the value of a continuous current in a continuous, non-pulsed laser. A system on chip (SOC), which may include a HAMR channel, can generate a laser data signal that may be synchronous with, and offset from, a write signal by a certain period of time, and may calculate certain parameters such as peak current and pulse width that may be applied to the signals in a preamp. The preamp signals can be used to program data to a disc medium.

20 Claims, 8 Drawing Sheets

HAMR CHANNEL TO PREAMP INTERFACE

BACKGROUND

The present disclosure generally relates to data storage systems, such as disc memory. Specifically, the present disclosure relates to HAMR channel to preamp interface.

SUMMARY

In certain embodiments, an apparatus may comprise an output configured to provide a laser data signal to a preamp and a sub-circuit configured to manipulate the laser data signal prior to providing the laser data signal to the output.

In certain embodiments, an apparatus may comprise a data storage including a laser configured to heat a data storage medium and a preamp configured to provide laser current to the laser. The apparatus may further comprise a circuit having an output configured to provide a laser data signal to the preamp to generate the laser current.

In certain embodiments, a method may include determining a laser current required to heat a disc so that write data can be stored to a disc in a heat-assisted magnetic recording (HAMR) process and manipulating a laser data signal in a circuit prior to providing the laser data signal to a preamp.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

Heat-assisted magnetic recording (HAMR) can use a laser to heat a disc medium and then magnetically record data to the disc. In some embodiments, a laser diode may generate laser light which may be sent to a near field transducer (NFT) where the signal can be conditioned and directed to the disc. In certain embodiments, the laser light may be continuous which can lead to high power consumption and premature failure of the data storage device (DSD) due to high wear on the NFT.

A laser light waveform, and a preceding laser current waveform, can be determined by firmware, hardware (e.g. as a controller), or another device such as a system on chip (SOC). In some embodiments, the waveform may be continuous, while in other embodiments, it may be modulated or pulsed. It may be possible to generate a modulated laser current (and by extension, a laser light) waveform whose average value is substantially equal to a comparable continuous laser current. The average value of the laser current can be a function of several parameters, including pulse width, and minimum and maximum current settings.

Figure 1:
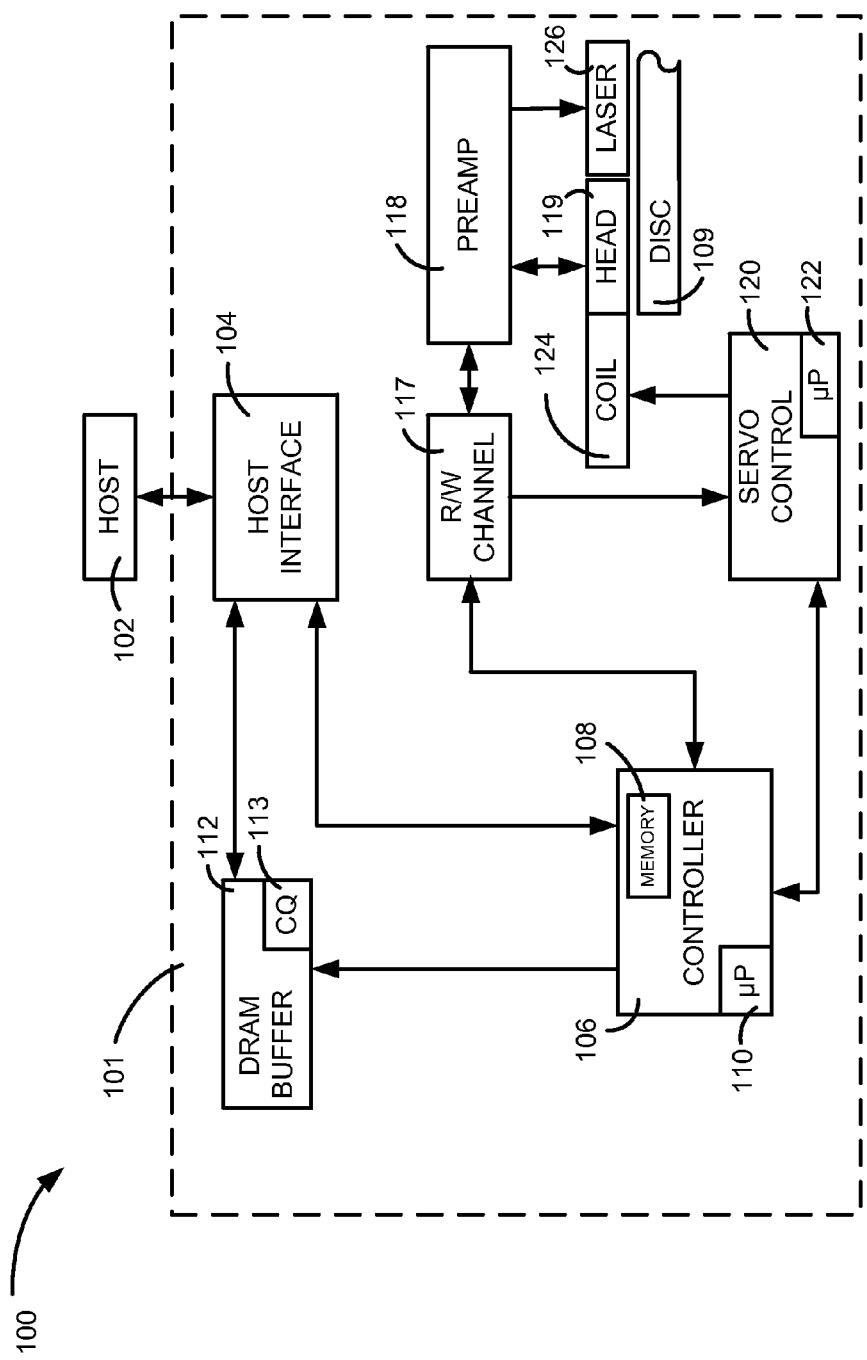
FIG. 1 is a diagram of HAMR channel to preamp interface, in accordance with certain embodiments of the present disclosure.

FIG. 1 depicts a system with a HAMR channel to preamp interface, generally designated 100. Specifically, the system 100 provides a functional block diagram of a data storage device (DSD) and in particular, a hard disc drive with HAMR. The DSD 101 can optionally connect to be removable from a host device 102, which can be a desktop computer, a laptop computer, a server, a telephone, a music player, another electronic device, or any combination thereof. The data storage device 101 can communicate with the host device 102 via the hardware/firmware based host interface circuit 104 that may include a connector (not shown) that allows the DSD 101 to be physically removed from the host 102.

The DSD 101 can include a programmable controller 106 with associated memory 108 and processor 110. The programmable controller 106 may be part of a system on chip (SOC). A buffer 112 can temporarily store user data during read and write operations and can include a command queue (CQ) 113 where multiple access operations can be temporarily stored pending execution. Further, the DSD 101 can include a read/write (R/W) channel 117, which can also include a HAMR channel. The channel 117 can encode data during write operations and reconstruct user data during read operations. A preamplifier/driver circuit (preamp) 118 can apply write currents to the head(s) 119 and can provide pre-amplification of readback signals. The preamp 118 can also generate a laser data current that can drive a laser diode 126, which can in turn heat the disc 109 for recording via the recording head 119. A servo control circuit 120 may use servo data to provide the appropriate current to the coil 124 to position the head(s) 119 over disc(s) 109. The controller 106 can communicate with a processor 122 to move the head(s) 119 to the desired locations on the disc(s) 109 during execution of various pending commands in the command queue 113 or during other operations. The channel configurations and systems described herein may be implemented in the R/W channel 117 as hardware circuits, software, memory, or any combination thereof. Further, the circuits described and shown in the DSD 101 may be incorporated into the SOC (not shown).

During operation of a HAMR channel, write data from the host 102 or other source may be sent to the preamp 118 via a channel-to-preamp interface (not shown); in certain embodiments, the channel-to-preamp interface may be positive emitter-coupled logic (PECL), emitter-coupled logic (ECL), or other type of logic interfaces. The write data may be conditioned in the preamp 118 and sent to a writer element (not shown) in the recording head 119, which can then store the write data to the disc 109 in a heat-assisted magnetic recording (HAMR) process.

A system on chip (SOC) can interface with a preamp to generate a modulating laser signal. The SOC, which can include a HAMR channel, can determine constants and can program them to registers in the preamp, and may also generate a laser data signal that can be sent to a circuit within the preamp that can generate a laser current of a predetermined shape. The laser current can be directed to a laser diode which can generate a laser light (whose waveform may be substantially equal to that of the laser current) that may be used to heat the disc in a HAMR process. The write data signal from the host may be routed through the SOC to the preamp and may be directed to a recording head so that it may be stored to the disc.

Figure 2:
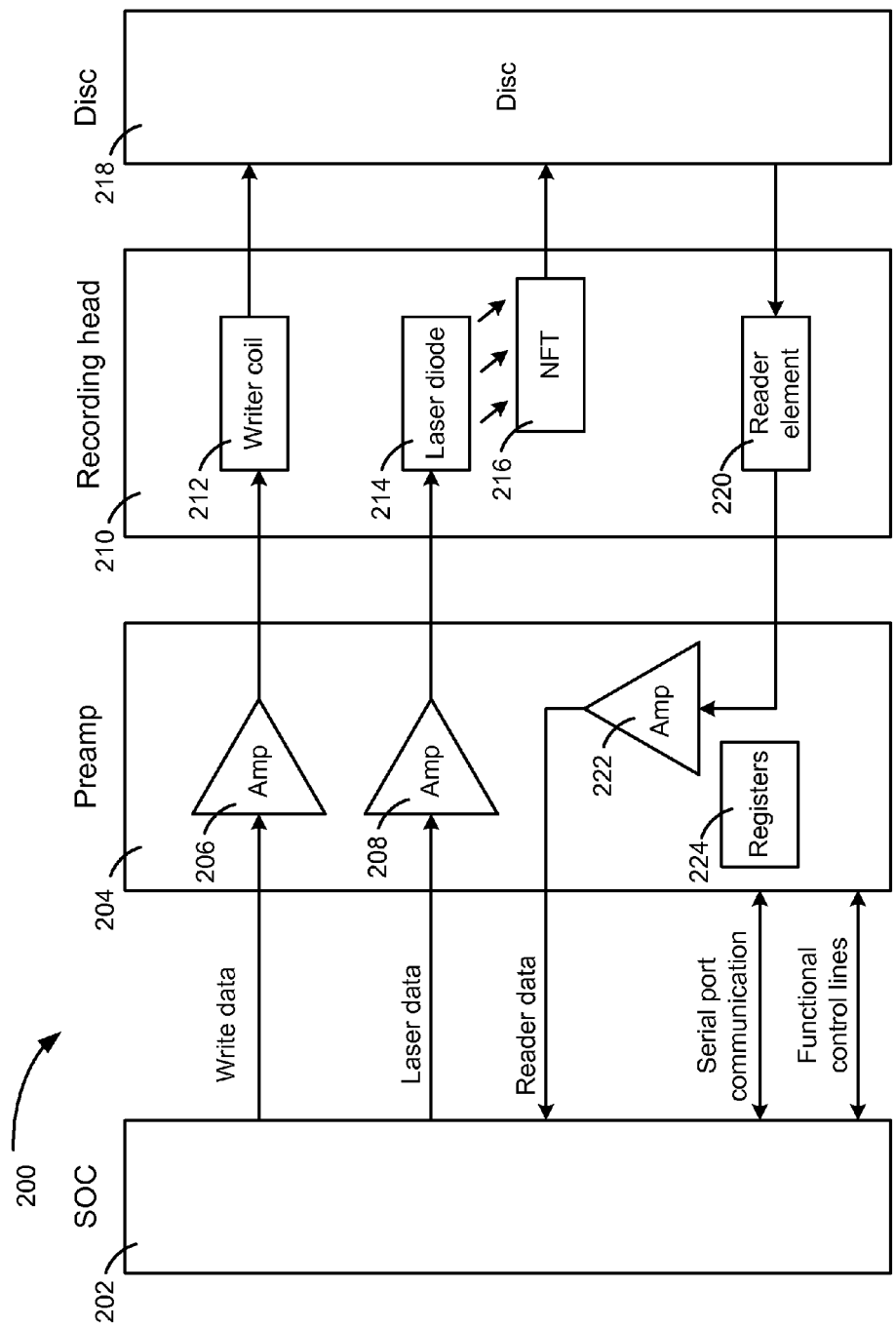
FIG. 2 is a diagram of HAMR channel to preamp interface, in accordance with certain embodiments of the present disclosure.

Referring to FIG. 2, a diagram of a HAMR channel-to-preamp interface is shown and generally designated 200. The SOC 202 can transmit the write data to the preamp 204, where it can be conditioned (e.g. amplified, buffered, filtered, etc.) by a circuit 206. The write signal may then be sent to a recording head 210 where it may drive a writer coil 212 to program the disc 218.

The SOC 202, which can include a HAMR channel, may generate a laser data signal and send it to the preamp 204. A circuit 208 can generate a laser data current that can drive a laser diode 214 which may transmit the laser light to an NFT 216 which, in turn, can heat the disc 218 for HAMR recording.

Data can be read from the disc 218 by a reader element 220 and can be conditioned by a circuit 222 prior to reaching the SOC 202.

The SOC 202 can program constants (for example, amplification, minimum and maximum laser current values, etc.) to the registers in the preamp 224 via an interface; in some embodiments, the interface may be a serial port. The constants in the registers may be changed anytime by the SOC 202.

A write data signal from the host or other source may be routed to the disc via the system on chip (SOC) and the preamp, can have a minimum pulse width (the minimum required transition time necessary to write to a disc), 1T, and may have larger pulse widths (e.g. 3T). The SOC can generate a laser data signal that can instruct a preamp output to transition from a minimum laser current to a maximum laser current. Both the rising and falling edges of the laser data signal can trigger a low to high transition of the laser current signal. Furthermore, the laser data signal can be synchronous with the write signal and have a pulse width equal to 1T, but may lag the write signal by a time delay, Td, which can be determined by, and implemented in the HAMR channel.

The SOC can determine a laser current waveform required for heat-assisted magnetic recording in a particular environment (including temperature, writer coil, and so forth). The preamp can generate the laser current based on the laser data signal and the constants stored in its registers, such as pulse width and current values. The laser data current can drive a laser diode, which can produce a laser light with a substantially equal waveform to that of the laser current. The pulse width of the laser current signal, Tw, can be a constant value programmed to the preamp by the SOC (Tw may be recalculated and reprogrammed on the fly). As the pulse width increases, which may be up to a maximum of 1T, the duty cycle can increase until it reaches 100%. Conversely, the as the pulse width decreases, the duty cycle can reach 0 percent. A brief explanation regarding how Tw can affect the average current can be found later in this document.

Figure 3:
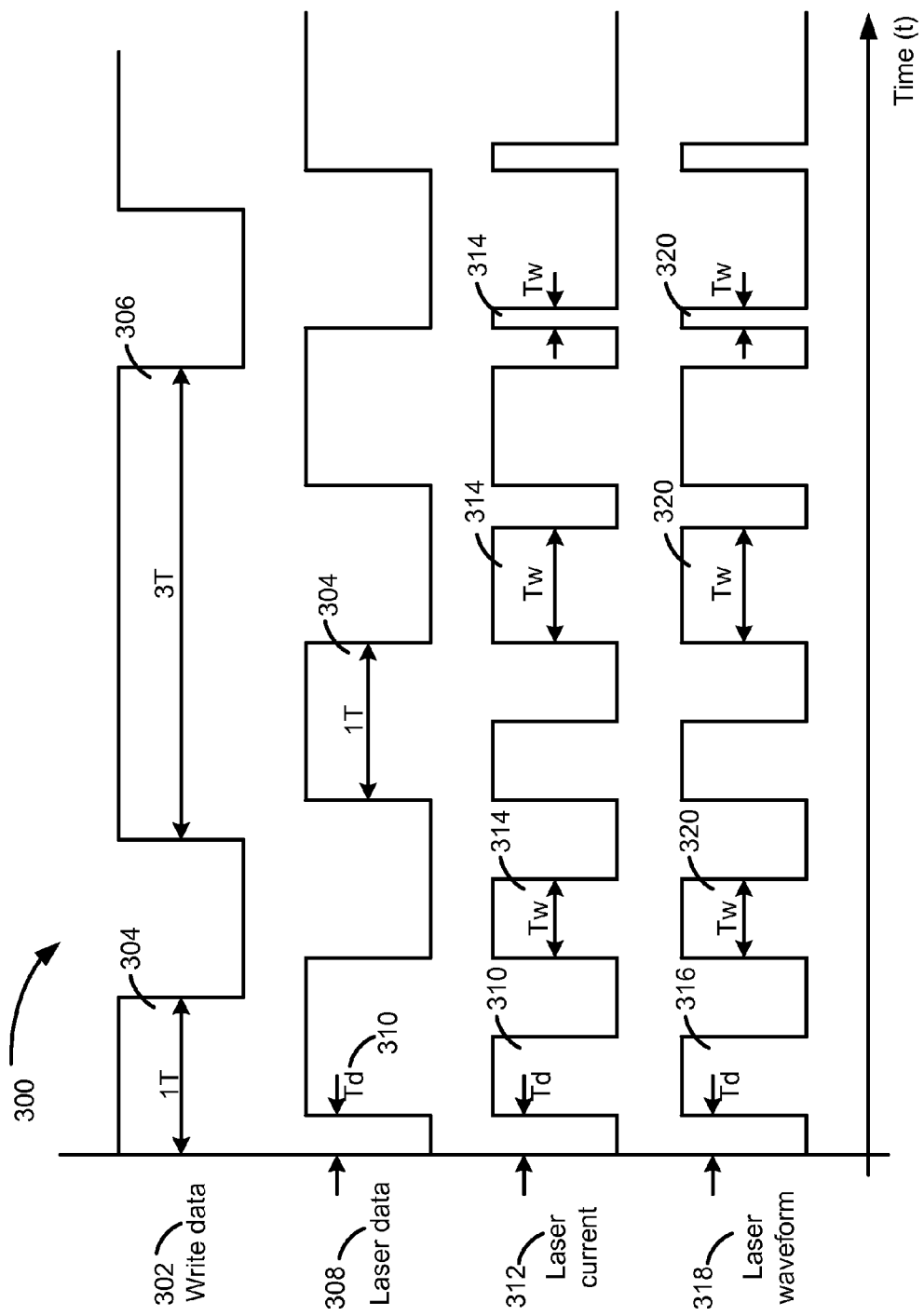
FIG. 3 is a diagram of HAMR channel to preamp interface, in accordance with certain embodiments of the present disclosure.

Referring to FIG. 3, a diagram of a HAMR channel to preamp interface is shown and is generally designated 300. A write data signal 302 may contain a data stream having a plurality of pulses, where each pulse may be one or more minimum pulse widths in duration. In an embodiment, there can be a minimum pulse width 1T, at 304, and another pulse of duration 3T, at 306. A laser data signal 308 may be synchronous with the write signal 302 and may be of a pulse duration 1T 304, but may lag by a time Td 310 (Td can be determined by the SOC).

The laser current signal 312 can be generated by the preamp based on the laser data signal and the constants in the preamp registers. Similar to the laser signal 308, the laser current 312 can lag the write signal 302 by a time Td, at 310. The pulse duration of the laser current, Tw, 314 can be calculated by the SOC and programmed to the preamp.

The waveform of the laser light signal 318, can be substantially equal to, and may be in synchrony with the laser current signal 312. The time delay Td, at 316, and pulse width 320 can be similar to the time delay Td, 310, and pulse width 314 of the laser current signal.

An artifact of magnetic recording can be non-linearities at the low-to-high and high-to-low transitions of the write data signal. The write signal or the laser data signal may be transition shifted, or precompensated, by a time Tcomp to mitigate the effects of the non-linearities.

Figure 4:
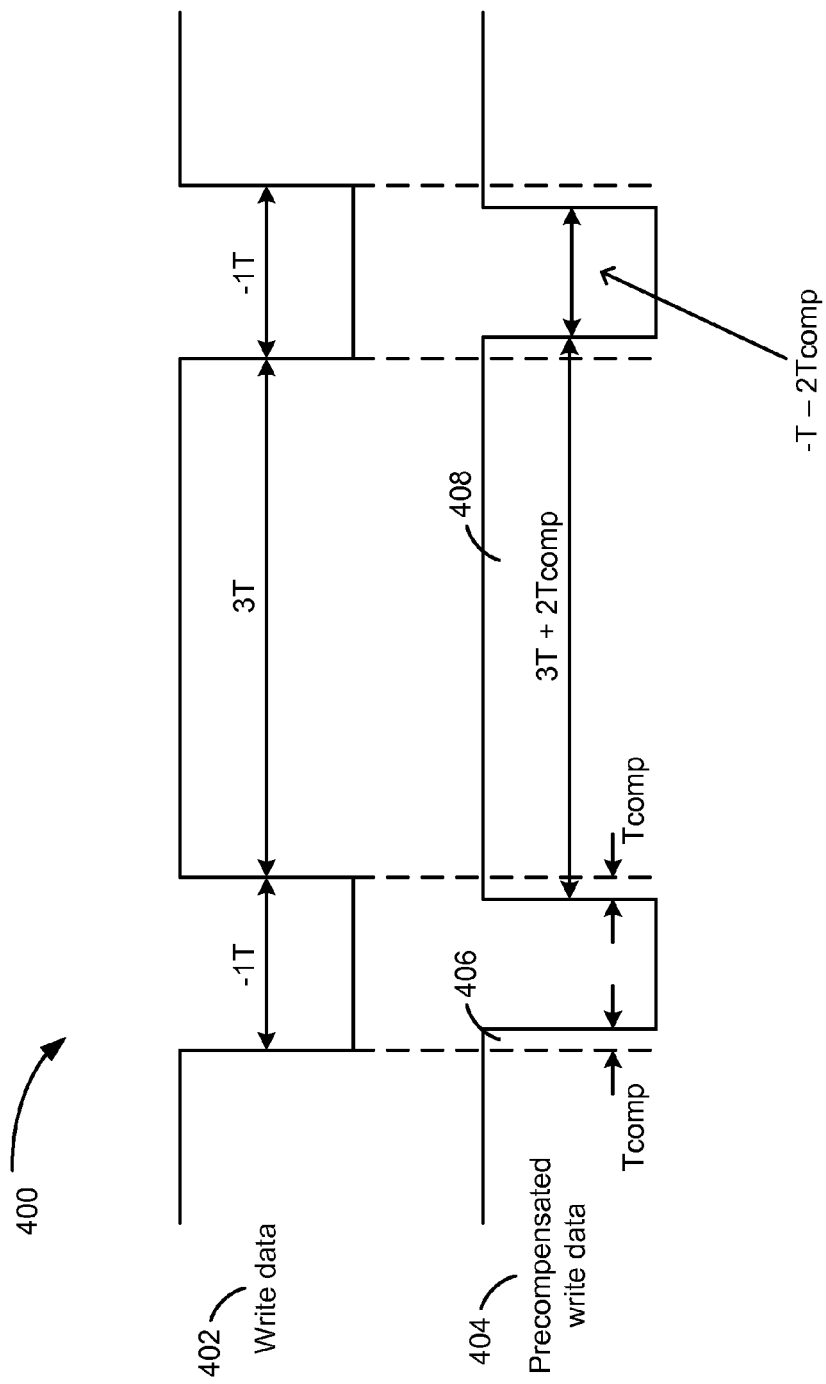
FIG. 4 is a diagram of HAMR channel to preamp interface, in accordance with certain embodiments of the present disclosure.

During precompensation, the pulse widths can be widened or shortened to avoid non-linearities at the transition points of the laser or write data signal. For example, referring to FIG. 4, a diagram of a HAMR channel to preamp interface is shown and is generally designated 400. In the embodiment of 400, the write signal 402 is precompensated 404, and the widths of negative pulses may be narrowed by 2Tcomp 406, which can result in the positive pulses being widened by 2Tcomp 408. In another embodiment, the widths of the positive pulses may be narrowed while the widths of the negative pulses may be widened.

Figure 5:
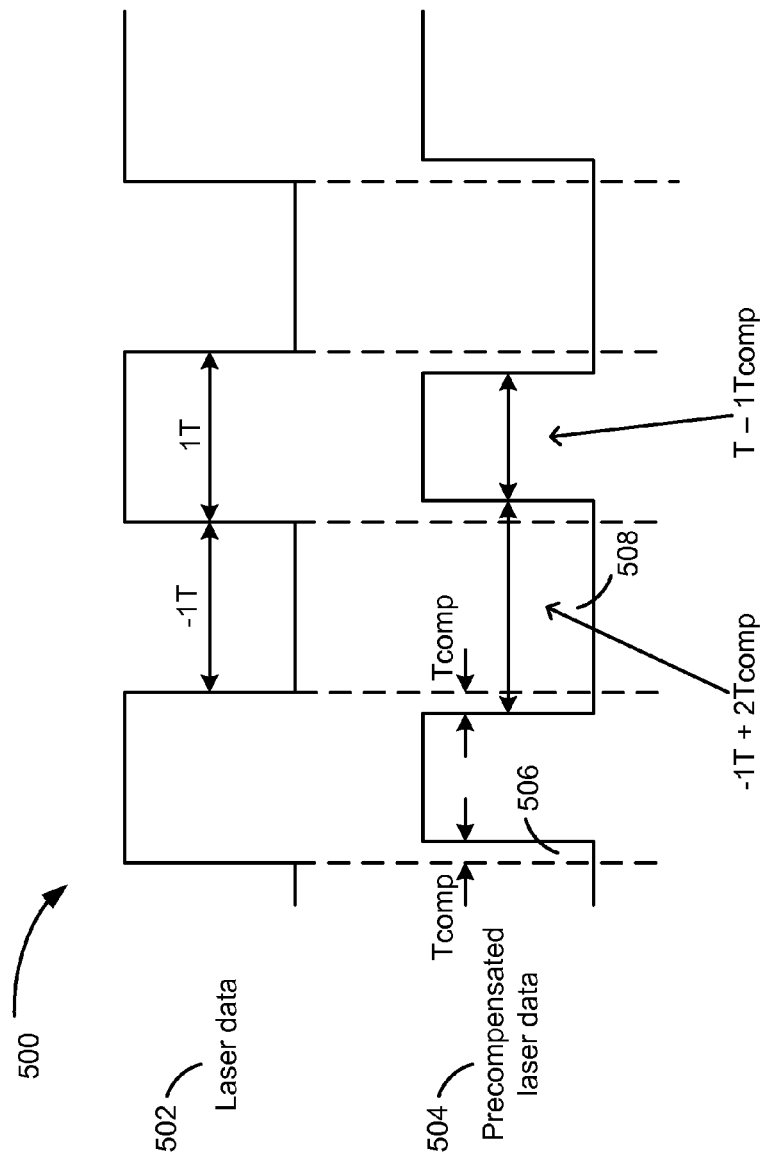
FIG. 5 is a diagram of HAMR channel to preamp interface, in accordance with certain embodiments of the present disclosure.

Referring to FIG. 5, a diagram of a HAMR channel to preamp interface is shown and is generally designated 500. In this particular embodiment, the laser signal 502 can be precompensated 504. The positive pulse width can be narrowed by 2Tcomp 506, which can cause the negative pulse widths to be widened by 2Tcomp 508. In another embodiment, precompensation of the laser signal can result in the positive pulse widths being widened and the negative pulse widths being narrowed.

In some embodiments, the SOC can set the operating points (values of the peak, continuous, and minimum currents, and so forth) and program them as constants to the preamp. In other embodiments, firmware or other circuits may set the operating points. The current constants, in conjunction with other parameters such as pulse width (discussed earlier) can be used by the preamp to generate a predetermined laser current waveform.

The average value of the pulsed laser current waveform can be determined by a minimum current, Imin, a peak current, Ipeak, and a pulse width, Tw. When Tw is equal to the laser data pulse width (1T) the laser current duty cycle can be at 100 percent and can be considered continuous with an average value equal to Ipeak. When Tw is 0, that is, when the duty cycle is 0 percent, the laser data can also be considered continuous with an average value equal to Imin. When the laser data current is not continuous, the average current can be a function of Imin, Ipeak, and Tw. For example, when Tw=T/2, the average laser data current can be (Ipeak−Imin)/2.

The values for Imin and Ipeak may be chosen for reasons other than to generate a laser data current with a specific average value. Other considerations, such as power supply capabilities and laser diode characteristics, may dictate what Imin and Ipeak can be. For example, the laser diode may have Ipeak restrictions because current that is too high can damage it.

The SOC and preamp may have different operating modes: continuous current and pulsed current. During continuous current mode operation, the SOC can stop generating a laser data signal, and the preamp can generate a dc laser current. In pulsed current mode operation, the preamp can generate a pulsed laser data current based on input from the laser data signal from SOC and the set operating points.

Figure 6:
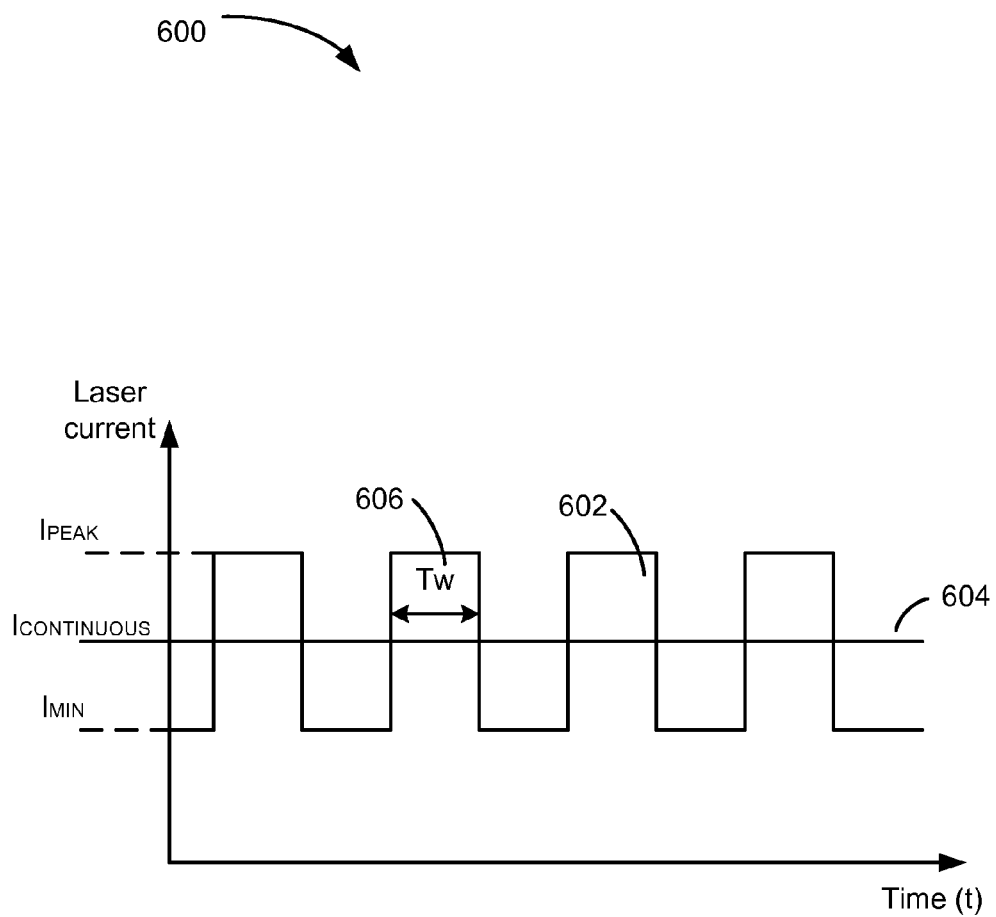
FIG. 6 is a diagram of HAMR channel to preamp interface, in accordance with certain embodiments of the present disclosure.

Referring to FIG. 6, a diagram of a HAMR channel to preamp interface is shown and is generally designated 600. A pulsed laser current 602 and a continuous laser current 604 are plotted verse time. The pulsed current 602 has a peak current, Ipeak, and a minimum current, Imin, and a pulse width Tw 606, and can be substantially equal to the continuous laser current 604.

Precompensation, time delay and preamp constants may be set at startup. There may be circumstances, such as changes in the ambient temperature of the data storage device, where it may be beneficial to change the settings in the system on chip (SOC) as well as constants in the preamp. In some embodiments, SOC settings and preamp constants can be changed on the fly, and can take effect after the write data has been recorded to the disc.

Precompensation of a laser data signal or a write data signal can widen or shorten the signal's pulse width to avoid non-linearities at the transition points of the signal. The SOC can set the precompensation levels that were determined during an optimization process, such as during manufacturing. In some embodiments, the laser data signal may be precompensated, while in other embodiments, the write data signal can be precompensated.

When the selected signal is precompensated, both the laser data signal and the write data signal can be sent from the SOC to a preamp over an interface; in some embodiments, the interface can be positive emitter-coupled logic (PECL). The preamp can condition the write data signal and generate a laser current such that the write data can be stored.

Figure 7:
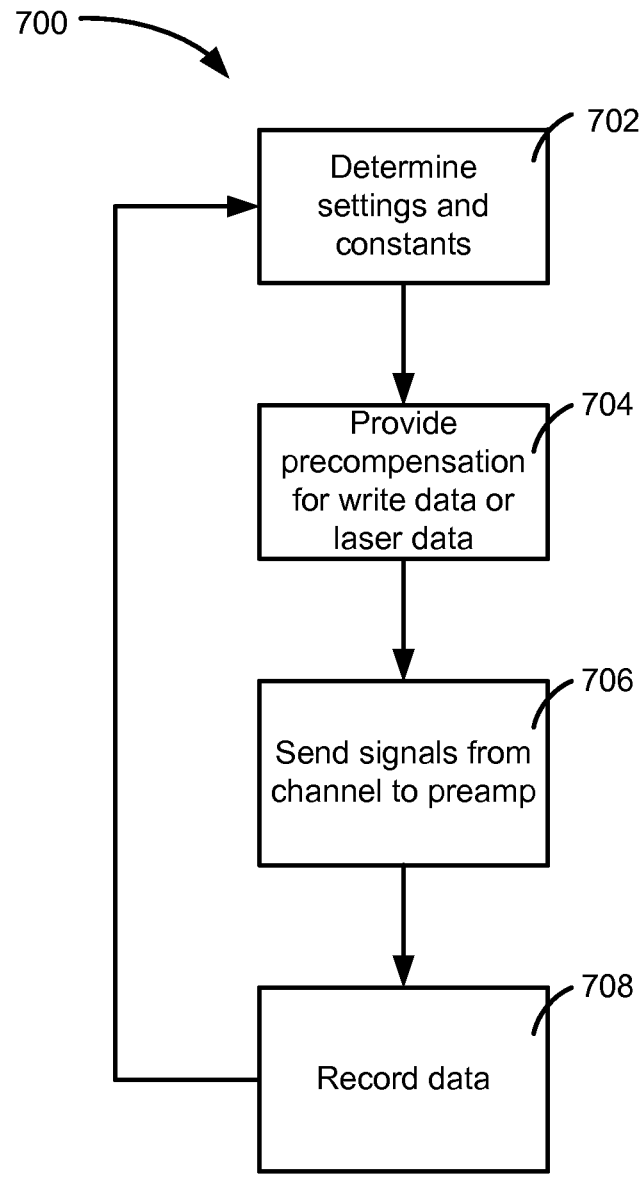
FIG. 7 is a flowchart of a method of HAMR channel to preamp interface, in accordance with certain embodiments of the present disclosure.

Referring to FIG. 7, a flowchart of a method for a HAMR channel to preamp interface is shown and generally designated 700. Firmware, which may use values from a read adapter parameter (RAP) file, can set SOC settings and preamp constants, at 702, and a signal can be precompensated at 704. The laser data signal and write data signal can be sent to the preamp from the SOC at 706, and the write data signal can be recorded to the SOC at 708.

Figure 8:
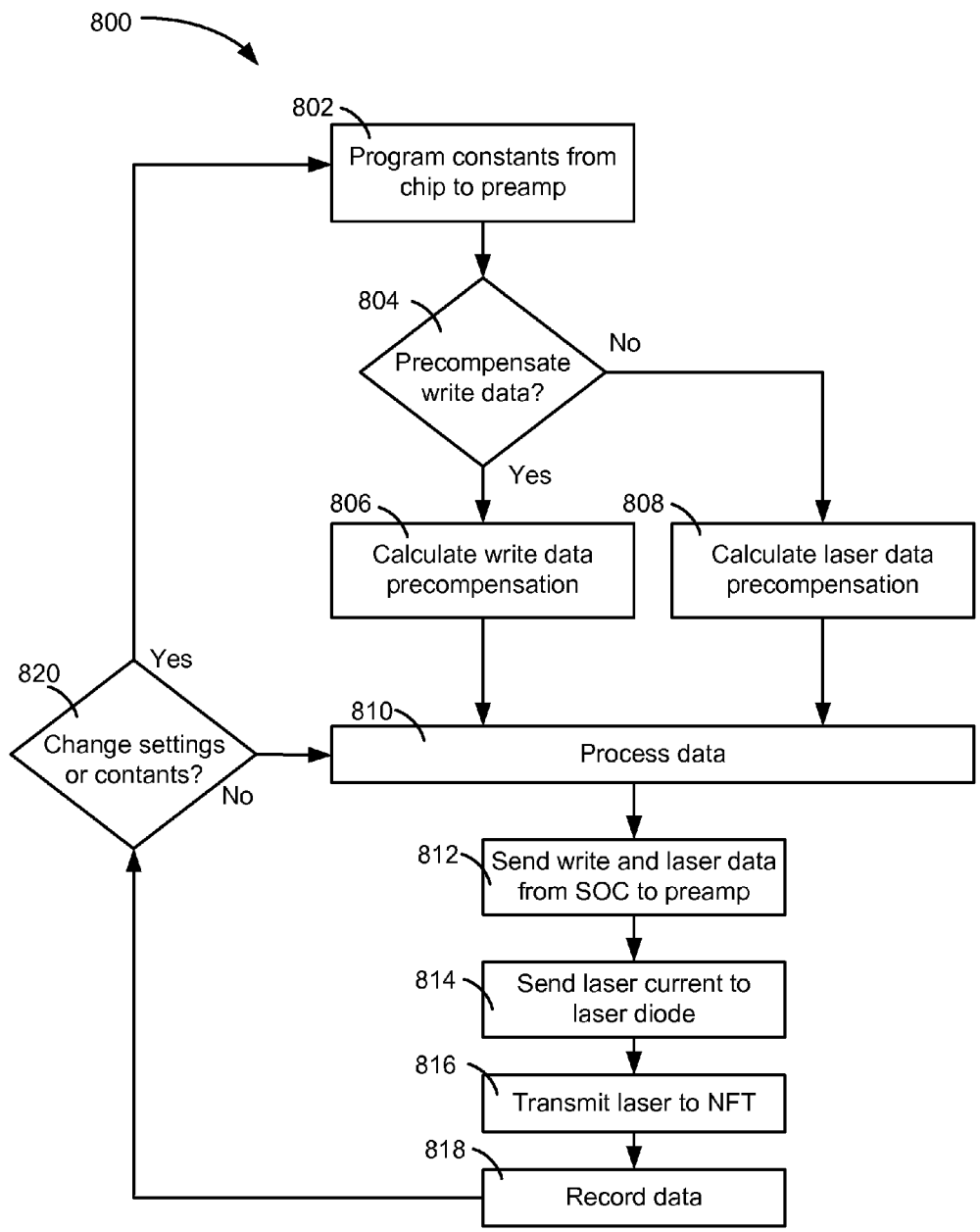
FIG. 8 is a flowchart of a method of HAMR channel to preamp interface, in accordance with certain embodiments of the present disclosure.

Referring to FIG. 8, a flowchart of a method for a HAMR channel to preamp interface is shown and generally designated 800. Initially, the SOC, which can use values from a RAP file, may program constants, such as peak and minimum current values, to registers in the preamp, at 802. The SOC may determine whether to precompensate the write data signal or the laser data signal, at 804, and then precompensate the write data signal or laser data signal, at 806 and 808, respectively.

Once the constants have been programmed and the precompensation calculations have been made, the data storage device (DSD) may process write data from the host (or other source), and the SOC can generate a laser data signal, at 810. The write signal and laser data signal may be transmitted from the HAMR channel to the preamp via an interface, such as an emitter-coupled logic (ECL) or a positive emitter-coupled logic (PECL), at 812. The preamp can generate a laser current and route it to a laser diode at 814, and the laser diode can generate a laser light with a waveform substantially equal to the laser current waveform.

Light from the laser diode can drive a near field transducer (NFT), at 816. The NFT can condition the light signal and direct it to the disc so that the disc can be heated and the write data signal recorded in a HAMR process, at 818.

After the data has been recorded, the DSD can determine if any changes to the SOC settings (e.g. Td, Tcomp, precompensation channel, laser data waveform, etc.) or preamp constants (e.g. Tw, Ipeak, Imin, etc.) need to be made at 820. When changes are necessary, new constants can be programmed at 802, otherwise the DSD may continue to process data at 810.

In accordance with various embodiments, the methods described herein may be implemented as one or more software programs running on a computer processor or controller. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device including instructions that when executed cause a processor to perform the methods.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit including:
     a sub-circuit configured to manipulate a laser data signal; and
     an output configured to provide the laser data signal to a preamp to generate laser current, the circuit configured to:
     modulate the laser data signal so that it is offset from a write data signal; and
     modulate the laser data signal such that a pulse width of the laser data signal is the same as a minimum pulse width of the write data signal.

2. The apparatus of claim 1 further comprising the circuit configured to:
   determine a laser current required to heat a disc so that write data can be stored to the disc.

3. The apparatus of claim 2 further comprising the circuit configured to:
  determine settings necessary to program to the preamp so that the preamp can generate the laser current; and
  program the settings to the preamp.

4. The apparatus of claim 1, wherein the laser current is uncoupled from a write signal in the preamp, the write signal corresponding to the write data signal.

5. The apparatus of claim 3 further comprising the preamp configured to:
  generate the laser current such that it is synchronous with the laser data signal;
  generate the laser current based on the laser data signal and the settings; and
  drive a laser diode with the laser current.

6. The apparatus of claim 5 further comprising the settings include laser current settings in the preamp including a pulse width setting, peak amplitude setting, and minimum amplitude setting.

7. The apparatus of claim 5 further comprising:
  a laser configured to heat the disc; and
  the circuit configured to:
    precompensate the laser data signal by changing a pulse width of the laser data signal.

8. The apparatus of claim 5 further comprising the circuit configured to:
  precompensate the write data signal by changing a pulse width of the write data signal.

9. An apparatus comprising:
  a data storage device (DSD) including:
    a laser configured to heat a data storage medium;
    a preamp configured to:
      manipulate a peak amplitude and a minimum amplitude of laser current such that a combination of the peak amplitude and the minimum amplitude yield an equivalent modulated laser current; and
      provide the laser current to the laser; and
    a circuit configured to:
      manipulate a laser data signal;
      provide the laser data signal to the preamp to generate the laser current; and
      determine the equivalent modulated laser current, the equivalent modulated laser current corresponding to the laser current.

10. The apparatus of claim 9 further comprising:
  the data storage medium is a magnetic disk.

11. The apparatus of claim 9, the equivalent modulated laser current having an average value equal to the laser current, and further comprising the circuit configured to:
  determine the laser current to heat a disc when write data is to be stored to the disc.

12. The apparatus of claim 11 further comprising the circuit configured to:
  determine settings necessary to program to the preamp so that the preamp can generate the laser current; and
  program the settings to the preamp.

13. The apparatus of claim 12 further comprising the preamp configured to:
  generate the laser current such that it is synchronous with the laser data signal;
  generate the laser current based on the laser data signal and the settings; and
  drive the laser with the laser current.

14. The apparatus of claim 13 further comprising the preamp configured to:
  manipulate the peak amplitude, the minimum amplitude, and a pulse width of the laser current such that a combination of the pulse width, the peak amplitude, and the minimum amplitude yield the equivalent modulated laser current.

15. The apparatus of claim 14 further comprising the circuit configured to:
  modulate the laser data signal so that it is offset from a write data signal; and
  modulate the laser data signal such that a pulse width of the laser data signal is the same as a minimum pulse width of the write data signal.

16. A method comprising:
  determining a laser current to heat a disc in a heat-assisted magnetic recording (HAMR) process;
  manipulating a laser data signal via a circuit prior to providing the laser data signal to a preamp;
  sending the laser data signal to the preamp;
  manipulating the laser data current in the preamp based on the laser data signal and settings of the preamp;
  generating the laser current with the preamp;
  driving a laser with the laser current;
  determining if the settings of the preamp need to be changed;
  reprogramming the settings of the preamp when they need to be changed; and
  generating the laser current with the reprogrammed preamp.

17. The method of claim 16 further comprising:
  sending the laser data signal and a write data signal from the circuit to the preamp.

18. The method of claim 17 further comprising the settings of the preamp include laser current settings in the preamp including a pulse width setting, peak amplitude setting, and minimum amplitude setting.

19. The method of claim 17 further comprising:
  determining if settings of the circuit need to be changed;
  reprogramming the settings of the circuit when they need to be changed; and
  processing the write data signal based on the settings of the reprogrammed circuit and the settings of the reprogrammed preamp.

20. The method of claim 17 further comprising:
  precompensating the laser data signal by changing a pulse width of the laser data signal; and
  precompensating the write data signal by changing a pulse width of the write data signal.

* * * * *